April 23, 1963   E. REINDL   3,086,663
CONVEYING SYSTEM
Filed Aug. 4, 1960   3 Sheets-Sheet 2
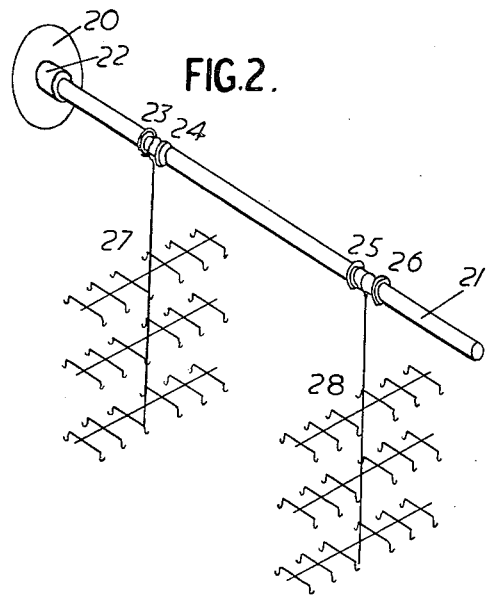
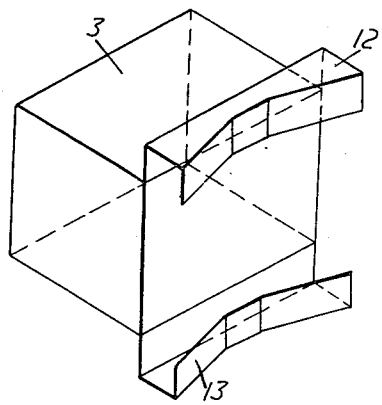
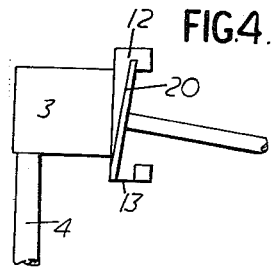
Inventor
ERICH REINDL
By Paul W. Hemminger
Agent April 23, 1963 E. REINDL 3,086,663
CONVEYING SYSTEM
Filed Aug. 4, 1960 3 Sheets-Sheet 3
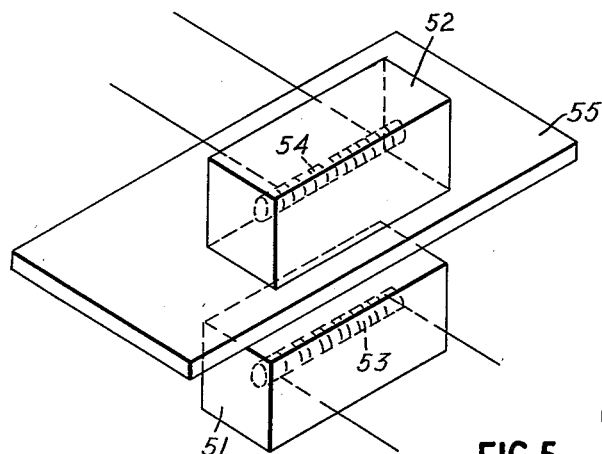
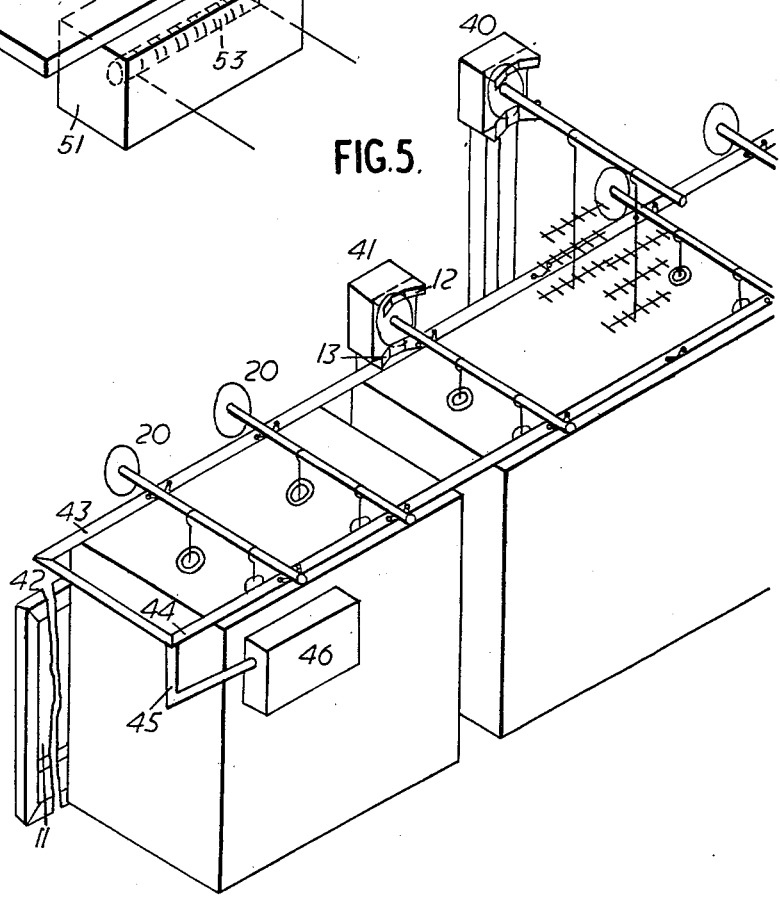
Inventor
ERICH REINDL United States Patent Office 3,086,663
Patented Apr. 23, 1963

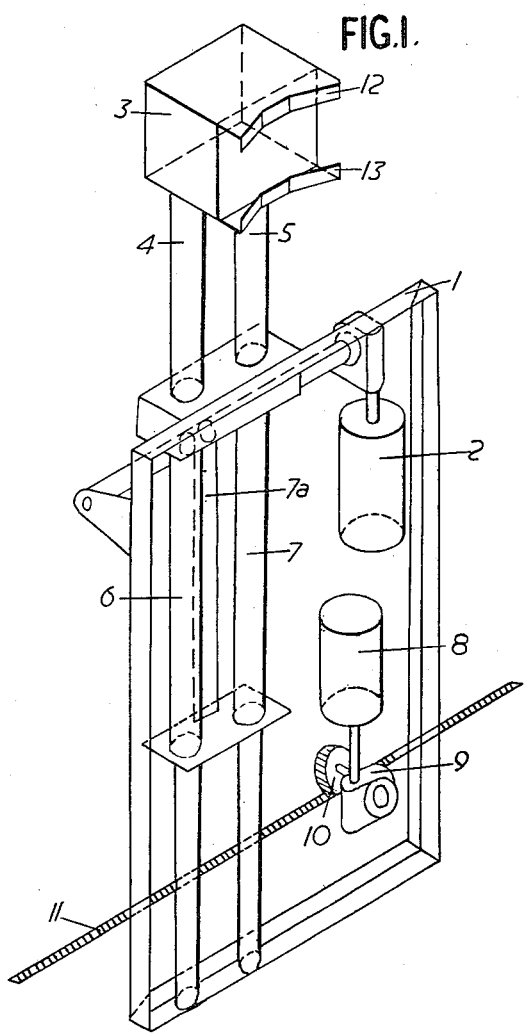

3,086,663
CONVEYING SYSTEM
Erich Reindl, Vienna, Austria, assignor to International Standard Electric Corporation, New York, N.Y., a corporation of Delaware
Filed Aug. 4, 1960, Ser. No. 46,454
Claims priority, application Austria Aug. 13, 1959
2 Claims. (Cl. 214—1)

This invention relates in general to programmed conveying systems for electroplating plants and in particular to apparatus for use in systems of the above character. Its principal object is to provide apparatus for selectively seizing the support bars for the objects being plated, moving such bars from one bath to another, and releasing them after the objects are positioned in the new bath.

In prior-art system, the conveyance of objects from one bath to another was accomplished by a complex mechanism which followed a programmed path to move to a particular position, move into mechanical latching engagement with the selected support bar and then move the bar to the next bath. Other known arrangements utilized pusher mechanisms for moving the plating bars on and off a conveying track. These systems have the disadvantages that complicated gearing and control apparatus are required for seizing and holding selected support bars for transport from one bath to another.

According to the present invention, the seizing head of the conveying system comprises an electromagnet which when energized seizes the support bar currently in close association therewith. This arrangement eliminates the prior-art, costly selecting and seizing mechanism.

A feature of the invention relates to the cooperating support bar for holding the objects being plated. This bar is provided with a disc located at one end perpendicular to the axis of the support bar and which is made of suitable magnetic material. This disc provides substantial surface area for insuring positive seizure thereof when the magnet of the seizing head is energized.

A related feature of the seizing head resides in the arrangement wherein guide projections on the head insure proper alignment of the support bar discs before seizure and also prevent unwanted release of the support bars in case of failure of the electromagnet.

A further feature relates to the reliable switching mechanism employed for energizing the magnetic head influencing each other.

Other features and objects of the invention will become apparent, and the invention will be best understood, by reference to the accompanying drawings comprising FIGS. 1 to 6 wherein:

FIG. 1 shows a schematic view of the conveying apparatus;

FIG. 2 shows the support bars and hangers for supporting the objects to be plated;

FIG. 3 shows the details of the projections on the seizing head for positioning and preventing erroneous release of a support bar;

FIG. 4 shows a side view of the seizing head and support bar in operative relationship with the magnetic head de-energized.

FIG. 5 shows a schematic plan of the entire plating system embodying the invention; and FIG. 6 shows a switching arrangement for controlling the electromagnetic head.

In FIG. 1, frame 1 supports a motor 2 which is geared to raise and lower the electromagnetic head 3. The head 3 is supported on telescoping tubes 4, 5, and 6, 7 with the movement thereof being controlled by tape 7a. Frame 1 also supports a motor 8 and associated gearing 9 and wheel 10 for laterally conveying the rack 1 along the fixed toothed rack 11. Head 3 contains positioning and holding projections 12 and 13.

In FIG. 2, the support bar 21 has a disc 20 secured thereon by insulating sleeve 22 and contains location rings 23, 24 and 25, 26 for preventing lateral movement of hangers 27 and 28 which support the objects to be plated.

In FIGS. 3 and 4, the details of the cooperation between projections 12, 13 and the disc 20 are shown. When the electromagnetic head is energized, disc 20 is held in abutting relationship with the face of head 3 and when the electromagnetic head is de-energized, the disc 20 assumes the holding position shown in FIG. 4.

In the event the bars 21 are lying across the tanks, they are horizontal and disc 20 is parallel with the face of head 3. In this manner, the head 3 may easily traverse a succession of discs without seizing or moving them unless the head is energized. This permits free travel of the head into and out of operative relation with the discs without complicated routing of the head around non-selected discs.

In FIG. 5, one carriage 40 is shown in the lifted position with a support bar carried therewith. Carriage 41 is shown in position for seizing another support bar for conveyance. Each time a head 3 passes a support bar without seizing it, it automatically re-aligns the disc to overcome any lateral movement thereof such as may be caused by turbulence of the bath.

In FIG. 6, the switch for controlling the positioning of the carriage is shown. Two ferrite rods 53 and 54, each containing a winding, are connected to a suitable high frequency source and positioned so that when metallic strip 55 mounted on carriage 40 or 41, passes between the windings, the mutual inductance is altered and a stop signal is generated which controls the carriage. This switch is not subject to deterioration by the plating vapors.

I claim:
1. A conveying system for conveying articles from one container to another comprising: a support bar for said articles, a carriage, means for moving said carriage from one container to another, an electromagnetic head mounted on said carriage, means for raising and lowering said head to bring it into and out of operative relationship with said bar, a disk of magnetic material secured to one end of said bar in parallel relationship with the face of said head, said disk being responsive to the energization of said head when in operative relationship with said bar for magnetically locking said bar to said head for transport to another container, and a pair of L-shaped flanges extended outwardly from the face of said head to define an opening for the passage of said disk between said flanges and the face of said head.

2. A conveying system as claimed in claim 1 wherein said flanges are extended outwardly from the face of said head an amount sufficient to support said disk adjacent said face when said head is subsequently de-energized.

References Cited in the file of this patent
UNITED STATES PATENTS

| | | |
|---|---|---|
| 2,143,026 | Nordquist | Jan. 10, 1939 |
| 2,166,589 | Harrington | July 18, 1939 |
| 2,716,415 | Davis | Aug. 30, 1955 |
| 2,826,288 | Giaier | Mar. 11, 1958 |
| 2,885,055 | Hauck | May 5, 1959 |